US006527407B2

(12) United States Patent
Gluck

(10) Patent No.: US 6,527,407 B2
(45) Date of Patent: Mar. 4, 2003

(54) PROTECTIVE SYSTEM FOR AIRPORT RUNWAY AND TAXIWAY LIGHT FIXTURES

(76) Inventor: Lyle E. Gluck, 1711 NW. 86th Ave., Fort Lauderdale, FL (US) 33322

( * ) Notice: Subject to any disclaimer, the term of this patent is extended or adjusted under 35 U.S.C. 154(b) by 0 days.

(21) Appl. No.: 10/029,923

(22) Filed: Dec. 31, 2001

(65) Prior Publication Data

US 2002/0054492 A1 May 9, 2002

Related U.S. Application Data

(63) Continuation-in-part of application No. 09/638,621, filed on Aug. 15, 2000, now abandoned.

(51) Int. Cl.[7] .................................................. E01F 9/00
(52) U.S. Cl. ..................... 362/153.1; 362/145; 362/382; 362/431; 362/441; 403/306
(58) Field of Search ............................. 362/153.1, 145, 362/153, 382, 431, 441, 470, 376; 248/156, 545; 403/300, 306, 361

(56) References Cited

U.S. PATENT DOCUMENTS 5,122,798 A * 6/1992 Kaolian .................... 340/947
5,436,812 A * 7/1995 Stewart .................. 362/153.1
5,971,561 A * 10/1999 Fitzwater .................. 362/145

* cited by examiner

Primary Examiner—Sandra O'Shea
Assistant Examiner—Ronald E. DelGizzi
(74) Attorney, Agent, or Firm—M. K. Silverman

(57) ABSTRACT

A system for the protection of airport runway light fixtures and markers is disposed at or near the edge of aircraft runways, taxiway and airport signs. The system includes a thin flexible mat having an axial opening proportioned to enable placement of a runway light fixture or marker therethrough; and peripherally disposed apertures within the mat. The system further includes several anchors for the mat, each of which comprise a planar head, and means for penetration and engagement of earth upon which the mat is positioned. The penetration and engagement elements of each anchor integrally and rigidly depend from a lower surface of the planar head at a central axis. A greatest transverse cross-section of the engagement element is proportioned for complemental insertion within the peripheral apertures of the convex mat. The planar heads of the anchors each engage the mat when the engagement means have fully penetrated the earth upon which the mat is to be secured. The upper surface of the planar head of each anchor preferably includes an axially disposed nut, Allen head screw or the like proportioned for complemental engagement with the drive element of a power tool to effect rotation of the anchor into the earth.

30 Claims, 8 Drawing Sheets

PROTECTIVE SYSTEM FOR AIRPORT RUNWAY AND TAXIWAY LIGHT FIXTURES

REFERENCE TO RELATED APPLICATION

This case is a continuation-in-part of application Ser. No. 09/638,621, filed Aug. 15, 2000, now abandoned entitled Protective System for Airport Runway Light Fixtures.

BACKGROUND OF THE INVENTION

Present day airports, of whatever size, make use of numerous, often hundreds, of light fixtures for purposes of illumination of the edge of the airport runway, taxiway and parking areas to thereby minimize the possibility that an aircraft will inadvertently travel off the edge thereof. Such airport light fixtures involve considerable cost, both by way of initial capital investment, accidental breakage and maintenance in that the state-of-the-art runway light fixture is designed to withstand intense vibration and high wind velocity encountered in take-off and landing operations of jet aircraft, as well as bad weather. Such fixtures must, as well, remain operable over a broad range of environmental factors including heat, humidity, erosion, dust, wind, vegetation and insects. Accordingly, each runway light fixture represents a significant, but risk prone, capital asset of the airport. In order to protect this asset and to ensure maximum functionality, extensive use of mowing and other equipment is made to trim and limit the growth of grass and vegetation thereabout. However, such equipment may itself cause damage to runway lights. In many areas, it is also necessary to employ plant poisons and pesticides to protect runway lights from insects and the ingrowth of vegetation. Accordingly, the maintenance of runway lights entails not only the cost labor associated with continual trimming of vegetation but, as well, the potentially hazardous use of herbicides and pesticides to protect the light from vegetation, insects, and other small animals which might otherwise damage the runway lighting.

The prior art has addressed the above problem through the suggestion of complicated and expensive light fixtures or light fixture protectors and, inter alia is represented by U.S. Pat. No. 4,104,711 (1978) to Carter, entitled Airport Light Fixture; U.S. Pat. No. 5,122,798 (1992) to Kaolian, entitled Airport Ground Light Arrangement; U.S. Pat. No. 5,669,691 (1997) to Barrow, entitled Airport Runway or Taxiway Light Fixture; and U.S. Pat. No. 5,971,561 (1999) to Fitzwater, entitled Airport Field Light Protector.

All of the above solutions, while clearly useful in extending the life of airport runway light fixtures, provide no help in the above-described environmental problems associated with extensive groundwork and other maintenance directed to the vegetation which inevitably will try to envelop runway light fixtures. A recognition of such limitations in the prior art is reflected in Kaolian above which suggests the use of a semi-rigid disk shaped body formed of a weather-resistant material which comprises an integral part of the runway fixture per se. Therein, the disk requires excavation of earth and insertion of gravel under the disk. In other words, in systems such as Kaolian and Fitzwater above, a protective rigid or semi-rigid disk is essentially integrated as a part of the airport ground light unit. In such solutions, the outermost edge or periphery of such disk-like elements are susceptible to uplifting under the effect of jet blast, ambient wind, water, and the activity of insects and small animals even if the disk is positioned below ground level.

In addition, the structure of Fitzwater entirely enclosed the breakaway coupling of the light fixture, thereby negating its safety functions. That is, the fixture, in the invention as set forth below, if impacted by any part of an aircraft, will instantly break away and lie flat upon the ground. In Fitzwater, this will not occur.

Accordingly, none of the suggestions in the prior art which might, superficially, appear related to the present invention, are practical in terms of such long-term external effects thereupon. In addition, it is essential that any peripheral disk, skirt, or the like associated with a runway light be as flat as possible to minimize interference with, or damage to, lower blades of landscaping equipment, the use of which would remain necessary with respect to airport maintenance beyond the periphery of any system for the protection of airport runway light fixtures. It is further noted that the use of gravel to suppress foliage about landing strips has given rise to its own problems; for example, jet blast is capable of dislodging and blowing gravel about a taxiway thereby creating a hazard to other aircraft and to personnel in the area.

It is, thereby, to be appreciated that prior art attempts to suppress the growth of foliage and to control other factors impacting upon airport ground lights have been relatively ineffective and, as well, have proven costly in terms of manpower, maintenance and particularly the replacement of lights and other components of such ground light systems when damage thereto occurs.

The present invention thereby represents an effective alternative to such art as Kaolian and Fitzwater, referenced above.

With regard to U.S. Pat. No. 5,436,812 (1995) to Stewart, entitled Airport Marker System, the same teaches a generally conventional airport runway light fixture system including a metallic base plate and a concrete base thereabout of a type which it is an objective of the present system to entirely cover to thereby preclude encroachment of vegetation and insects upon the light fixture system, this is more fully set forth below.

SUMMARY OF THE INVENTION

The instant invention relates to a system for the protection of airport runway light fixtures having a co-axial, substantially ground level metallic support secured within a ground level and in-ground concrete base. The system more particularly comprises a flexible mat including an opening about a central axis thereof, said opening having a radius substantially equal to that of said metallic support from the vertical axis of said light fixture, said mat also having a plurality of peripherally located apertures. The system further includes a plurality of anchors for said mat, corresponding in number to the number of said apertures, each of said anchors comprising a planar head and, integral therewith, means for the penetration and engagement of the ground upon which said mat is to be positioned, said penetration means proportioned for complemental insertion through said peripheral apertures of said mat, wherein said heads of said anchors engage said mat when said penetration means are fully penetrated into the earth upon which said mat is to be secured. In a preferred embodiment, the upper surface of said planar head of each anchor comprises an axially disposed nut, Alan Head screw or the like proportioned for complemental engagement with a drive element of a power tool to thereby effect rotation of the anchor into the earth.

In view of the above, it is an object of the present invention to provide an improved system for the protection of airport runway light fixtures from airfield maintenance equipment, this inclusive of a protective mat therefore and method of efficient securement thereof to the area surrounding such runway and taxiway light fixtures.

It is another object of the invention to provide an airport ground lighting system having improved means for the suppression of foliage and pests thereabout.

It is a further object to provide a system of the above type which will reduce mowing presently associated with runway lighting and lighting fixtures.

It is a further object to provide an airport ground light system protection for reduction of soil erosion in the area about the fixture.

It is a yet further object of the invention to provide a means for the protection of airport runway light fixtures not susceptible to uplift under the influence of jet or propeller airblast.

It is still another object to provide an improved system to enhance the visibility of runway ground lights.

It is a still further object of the invention to provide a system for the protection of airport runway lights which will reduce the cost of labor associated with the use of herbicides and pesticides about said lights and will reduce risks to workers otherwise required to walk onto or near the airfield for such tasks.

It is a yet further object to provide a system of the above type which is fully compatible with all sizes and weights of lawn maintenance equipment and which will pose no risk to such equipment or to an aircraft that may inadvertently travel over such a system.

It is a still further object of the invention to provide a system of the above type which will, through the use of conventional portable power tools, can be quickly installed or repositioned.

It is a further object to provide a system of the above type which is essentially immovable after it has been properly secured about a runway light fixture or airport sign and into the earth.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Figure 1:
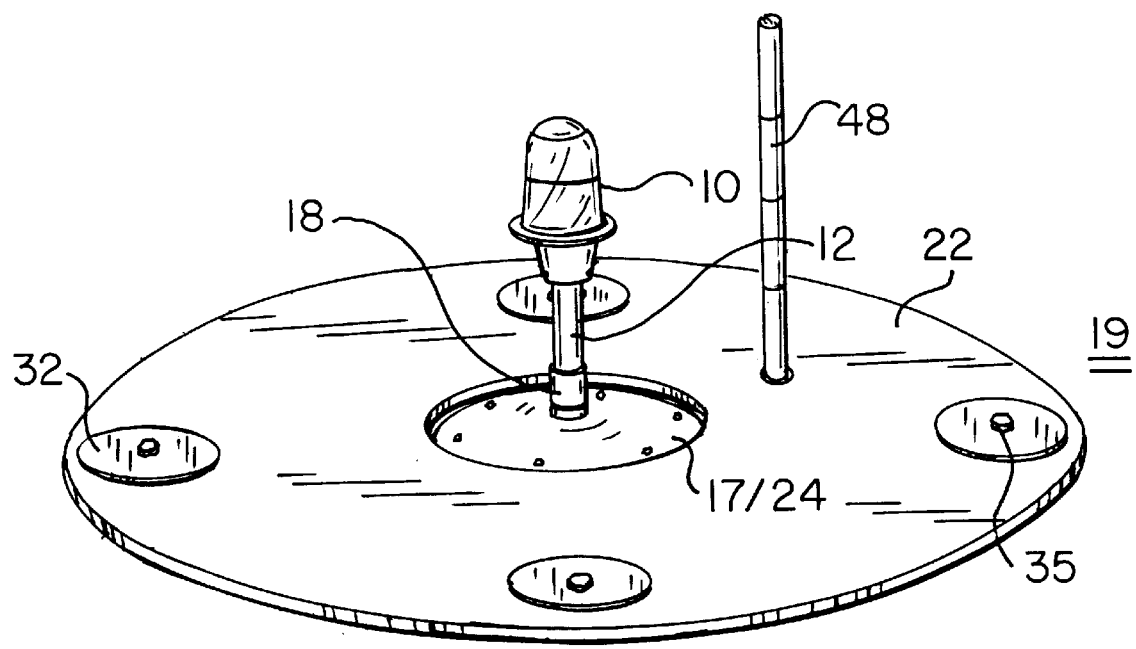
FIG. 1 is a perspective view of a first embodiment of the invention.

With reference to the perspective view of FIG. 1, the present system is shown as it appears after the same has been fully installed about an airport runway light fixture 10 of the type which is constitutes that most commonly used at airports. Such fixtures depend upwardly from a rigid conduit 12 and a breakaway or frangible coupling 18 through which run electrical wires 13 (see FIG. 3) which connect to electrical cabling 13A which is provided throughout the periphery of an airport runway. It is to be noted that such cabling 13A passes through an in-ground rigid concrete base 14 having a periphery 15 which, in a top view (not shown), will typically define a circle. However, periphery 15 of concrete base 14 may, at certain airports, define a square as viewed in a top view. In either embodiment, periphery 15 of concrete base 14 surrounds a periphery 16 of a substantially ground level metallic fixture support 17 which stabilizes said breakaway coupling 18 and conduit 12 of the light fixture 10. It is also possible, at certain airports, that said concrete base 14, which is embedded within earth 19. It is to be understood that the present invention does not apply to in-pavement runway light of typically larger airports.

Where said concrete base 14 is circular, as is typically the case, periphery 15 thereof will generally have a radius of about twice the radius defined by periphery 16 of metallic fixture support 17.

Figure 2:
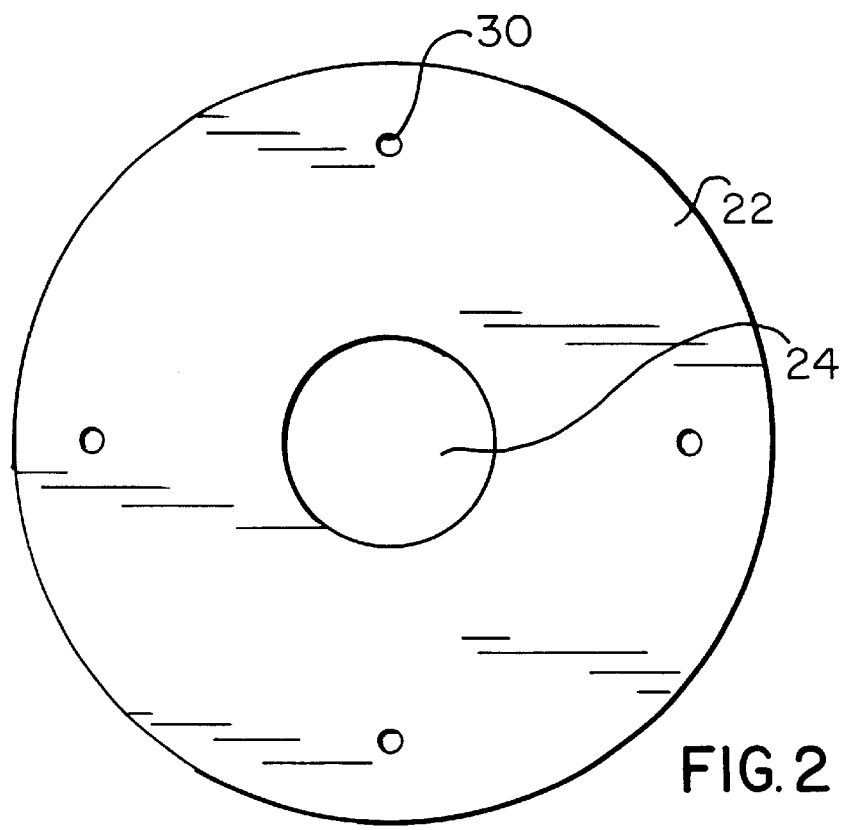
FIG. 2 is a bottom view of the runway light protector of FIG. 2 prior to the insertion thereinto of anchors.
Figure 3:
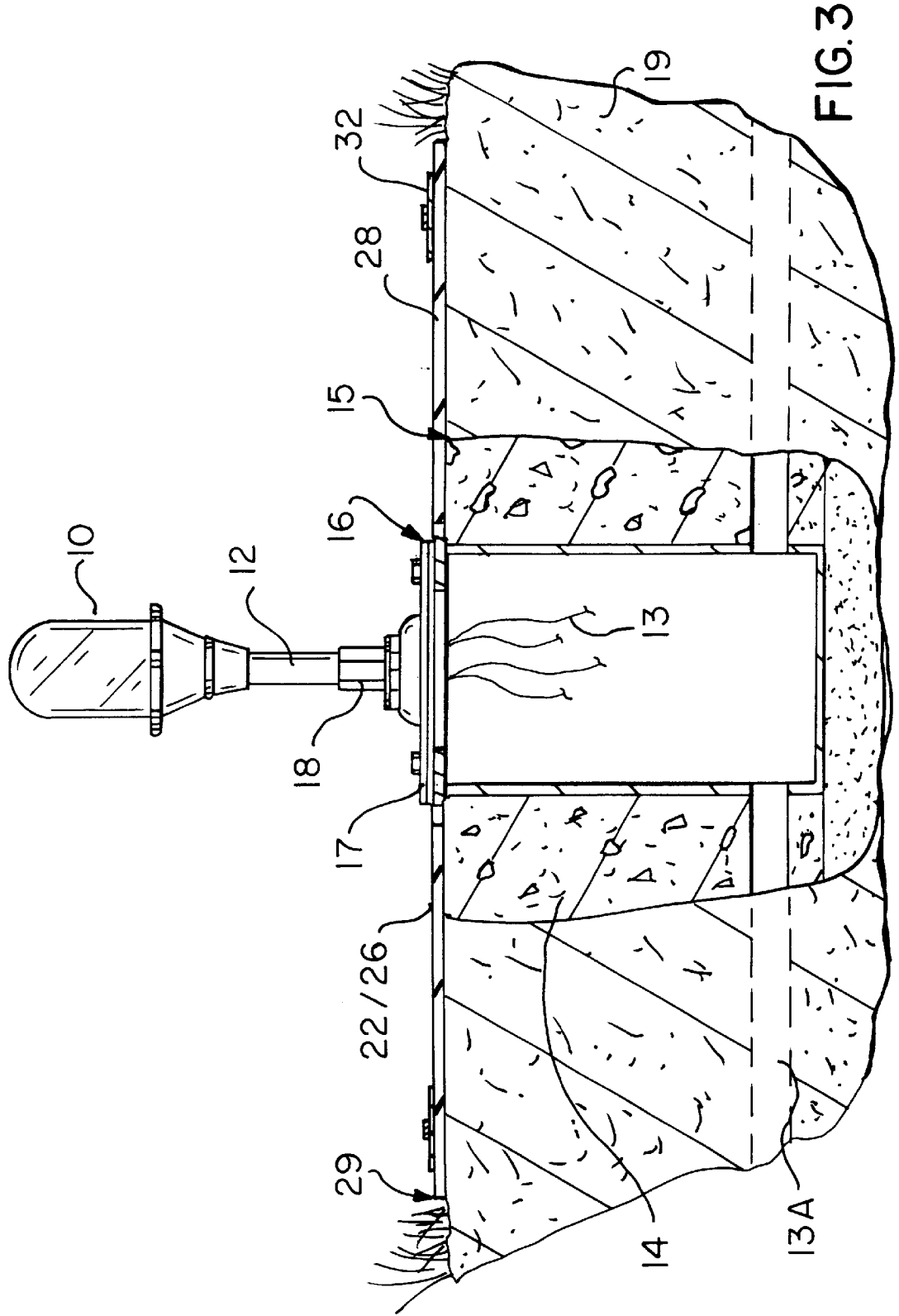
FIG. 3 is a vertical, axial, cross-sectional assembly view of the structure of FIG. 1.

The inventive system particularly includes a flexible mat 22 (see FIGS. 1 and 2), typically formed of a rubber or elastomeric material, which includes an axial opening 24 which is co-axial with said conduit 12 of the light fixture. Said opening 24 is proportioned to facilitate placement upon light fixture 10 and, more particularly, is provided with a radius which is substantially equal to the radius or least radial dimension (in the event that metallic support 17 is not circular) of metallic support 17. Therefore, as may be more particularly appreciated with reference to the view of FIG. 3, an innermost edge of mat 22 will abut periphery 16 of metallic fixture support 17. It is further noted that to achieve its objectives, as above set forth in the Background of the Invention, mat 22 must have a radius in a range of about 2 to about 2.5 times the ground level radius of periphery 15 of concrete base 14 if base 14 is circular at ground level, or if base 14 is square, mat 22 must be at least two times the average radial dimension thereof, relative to light fixture axis defined by conduit 12, in order to function satisfactorily. Accordingly, in the most common form of airport runway light construction, which is shown in FIG. 3, axial opening 24 of mat 22 will have a radius substantially equal to the radius of metallic fixture support 17 and will have an outermost radius, that is, radius at periphery 29 of mat 22 which is in a range of 2 to 2.5 times the radius (or average radial dimension) of concrete block 14, i.e., about 4 to 5 times the radius of metallic fixture support 17. It has been found that such ratios are advantageous in affording appropriate protection to the light fixture, coverage to concrete base 14, and to an annular region 28 between concrete block periphery 15 and mat periphery 29 to thereby preclude the growth of vegetation unduly close to the runway light fixture and to protect the same from the various other risks such as erosion, as are more particularly set forth in the Background of the Invention.

Figure 4:
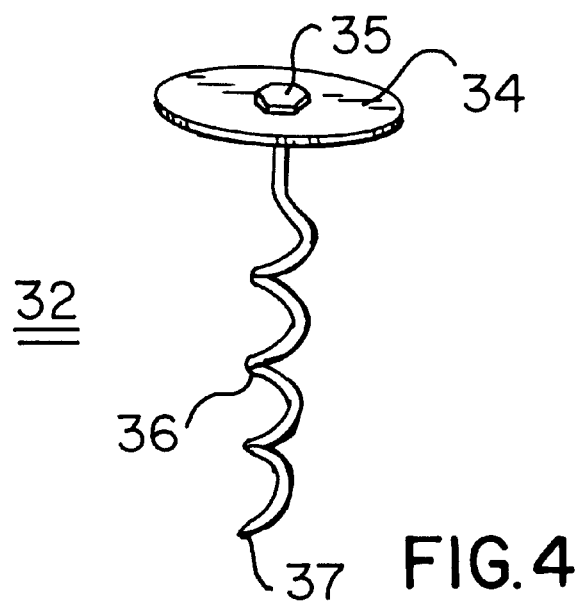
FIG. 4 is a perspective view of a first anchoring element employed with the present system.
Figure 5:
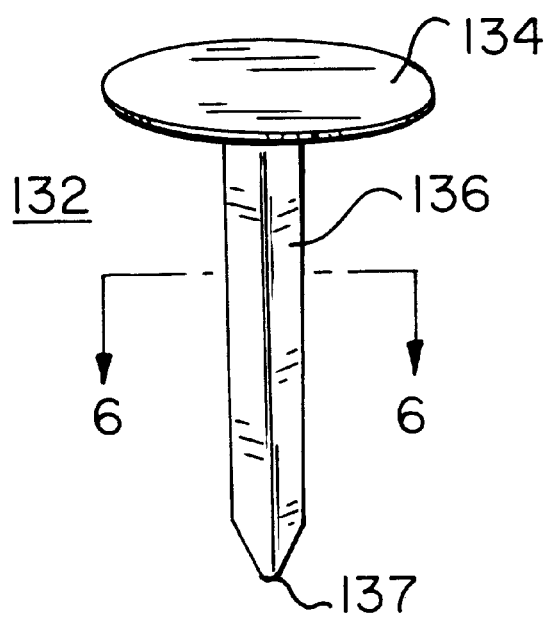
FIG. 5 is a perspective view of a second type of anchoring element that may be used with the instant system.

The above factors, taken in view of a typical radius of said metallic support 17 of about six inches, would dictate that a typical mat would have a radius of about b 24inches (and therefore a diameter of about 48 inches). A minimum radius of mat 22 would be about 30 inches. The thickness of a typical mat is in a range of about 0.5 to about 1.5 inches. This may be a function of the height of concrete base 14 above earth 19. Given that concrete base 14 will typically protrude slightly above the level of the earth, an inner annular portion 26 (see FIG. 3) of the mat will typically be slightly convex relative to said outer annular region 28. Within said region are provided a plurality of apertures 30 which are disposed near the periphery of the mat 22, the purpose thereof being to enable passage through said apertures of a plurality of anchors 32 (see FIG. 4), each of which includes a planar head 34 wherein said penetration means 36 typically comprise a spiral, the purpose of which is to effect the penetration and maximum engagement of ground upon which said mat is to be positioned.

Figure 6:
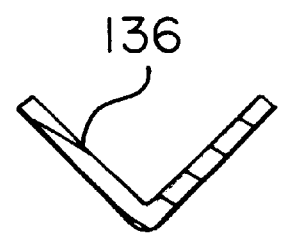
FIG. 6 is a radial cross-sectional view taken along Line 6—6 of FIG. 5.

A second embodiment of the anchor is shown as anchor 132 in FIG. 6, therein a V-shaped element 136 is employed in lieu of said spiral structure 36. However, in each anchor there is provided a sharp tip 37 or 137 respectively to assist in penetration of the earth. It is more particularly noted that in the embodiment of FIG. 4 (also shown in FIG. 1), the upper surface of the planar head 34 is provided with a protruding hex nut 35 or recessed Alan Head element which is proportioned for complemental engagement with a head of a portable power tool to thereby effect rotation of such element and, thusly, of the entire anchor 32 such that anchors may be quickly inserted into the ground with a minimum of difficulty. It has been found that an inexpensive readily available power tool such as a Makita or Black and Decker power drill may be employed to achieve this end. It has also been found that anchors 32 may be easily inserted into earth having a wide range of soil types. However, when the earth is particularly hard or stone-like, as is more common in northern glacial areas, such as Canada, a spike type anchor of the type of anchor 132 may be employed. However, in such case, a sledgehammer must be used to hammer anchors 132 into such rock-like earth.

It has been determined that the use of an anchor consisting of a large diameter planar head, the case in both anchors 32 and 132, typically having a radius of two to four inches will, when properly installed, secure mat 22 such that it is immovable under any influence including water, weather, jet blast, vegetation growth, or action of insects. It is thereby most difficult for erosion or vegetation to come close enough to the fixture 10 to impair the runway illumination of the fixture.

Figure 7:
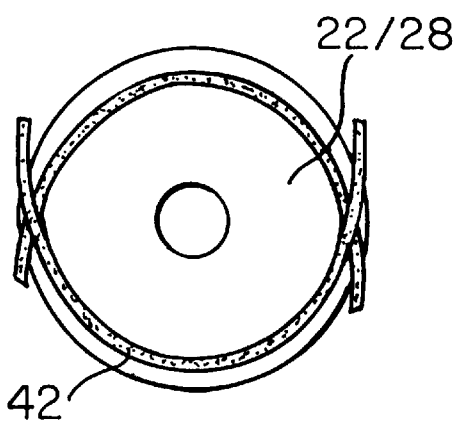
FIGS. 7 and 8 are top schematic views showing potential travel paths of edges of airport lawn mowing equipment.
Figure 8:
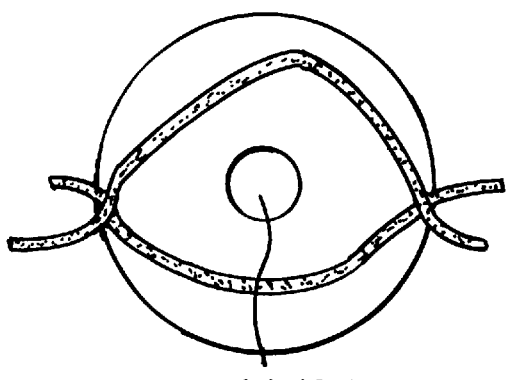

Further, as may be noted with reference to FIGS. 7 and 8, edges 42 mowing equipment of a type typically used at airport can safely pass over annular regions 28 (see also FIG. 3) of the mat, this due to its minimal thickness which, as above noted, is in the range of about 0.5 to about 1.5 inches but, preferably, is 0.5 inches, that is, approximately 13 millimeters. In general, the mat is formed of an elastomeric material, preferably a polymeric plastic, such as an EPDM polypropylene terpolymer. The weight of a mat of the above dimensions made of such material would be about 28 pounds, with a density of 0.68 ounces/cu.inch. and tensile strength of about 650 pounds. Accordingly due to the thinness, strength and flexibility of mat 22, the present system will not interfere with the normal operation of airport mowing equipment. By the same token, there need not be a concern that the wheels or landing gear of an aircraft, which happens to pass beyond the edge of runway or taxiway 20, will be interfered with by either mat 22 or the planar heads 34 of the mat anchors 32.

Figure 9:
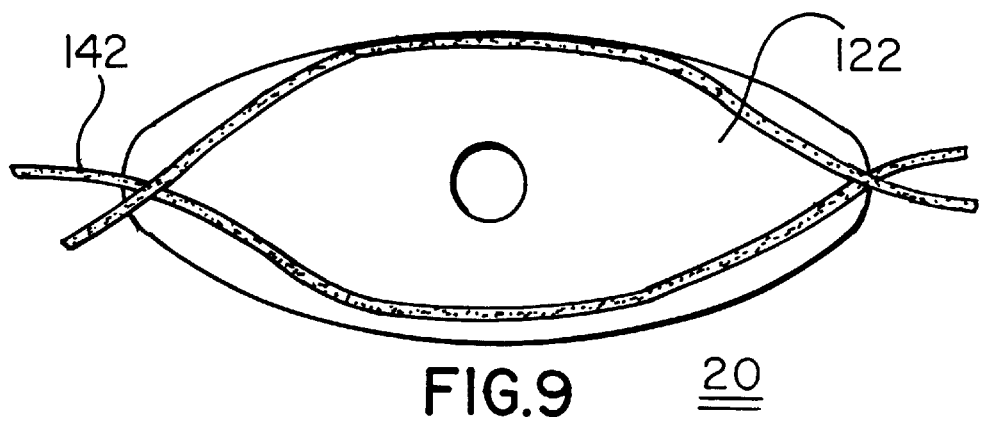
FIG. 9 is a top schematic view of an elliptical embodiment of the invention of FIGS. 1 though 8 showing the travel path of edges of an airport mowing equipment thereupon.

In an alternate embodiment of the invention, shown in FIG. 9, there may be provided an elliptical mat 122 in lieu of the circular mat 22 above described. Typical dimensions thereof would be about 48 inches by 84 inches with a weight of about 80 pounds. Such an elliptical mat structure may be advantageously employed in a number of applications where, for example, ground surface, visibility, or aesthetic considerations may dictate. For example, extending the length, in even a single axis, of the mat portion of the present system, will enhance ease of mowing and visibility of light fixture 10 from the aircraft runway 20, even if vegetation or foliage at the edge of the runway is not trimmed for a considerable period of time. Also, resistance to erosion of the earth surrounding lighting fixtures is increased through the use of the elliptical structure of mat 122. Such a structure, as is also noted in FIG. 9, is completely compatible with use with lawn mowing equipment and, in certain respects, is more suitable for such use in that the turning radii associated with mower travel along the edge of mat 122 is much than is the case of the turning radii associated with mower travel along or upon the periphery of circular mat 22. In FIGS. 7 to 9 the path of travel of the edge of the moving equipment is indicated by numbers 42 and 142.

It is further noted that mat 22 or 122 may be provided with a threaded aperture holes for the accommodation of so-called snow poles 48 (see FIG. 1) which are commonly used at airports in colder climates during much of the year.

Figure 10:
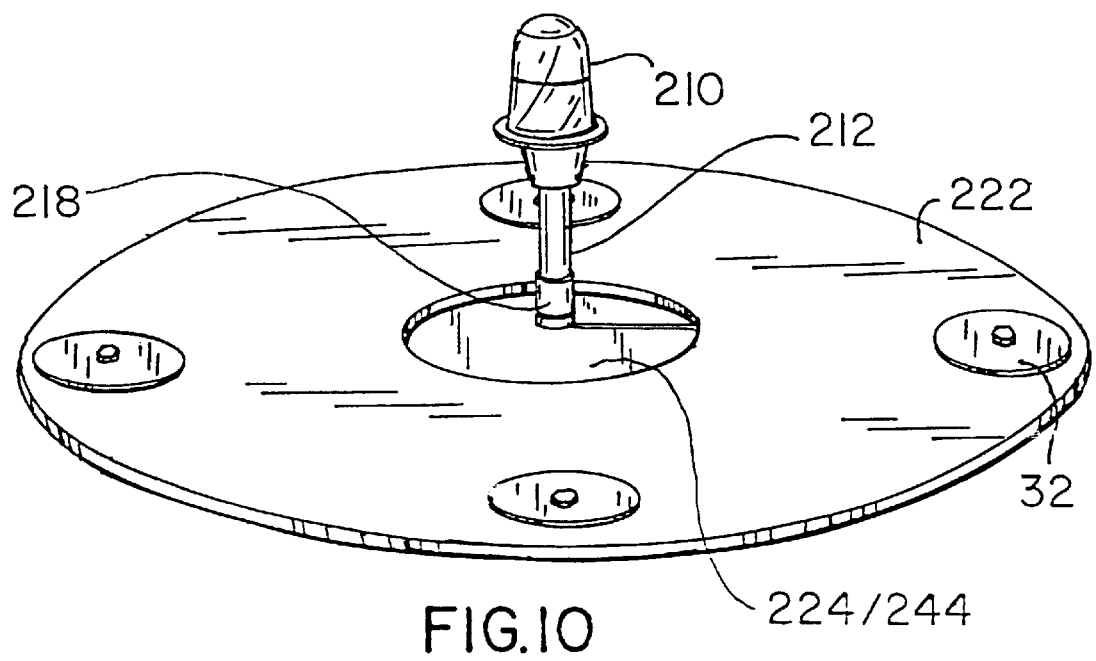
FIG. 10 is a perspective view of a second embodiment of the invention, the same particularly adapted for use with stake-type runway lights.
Figure 11:
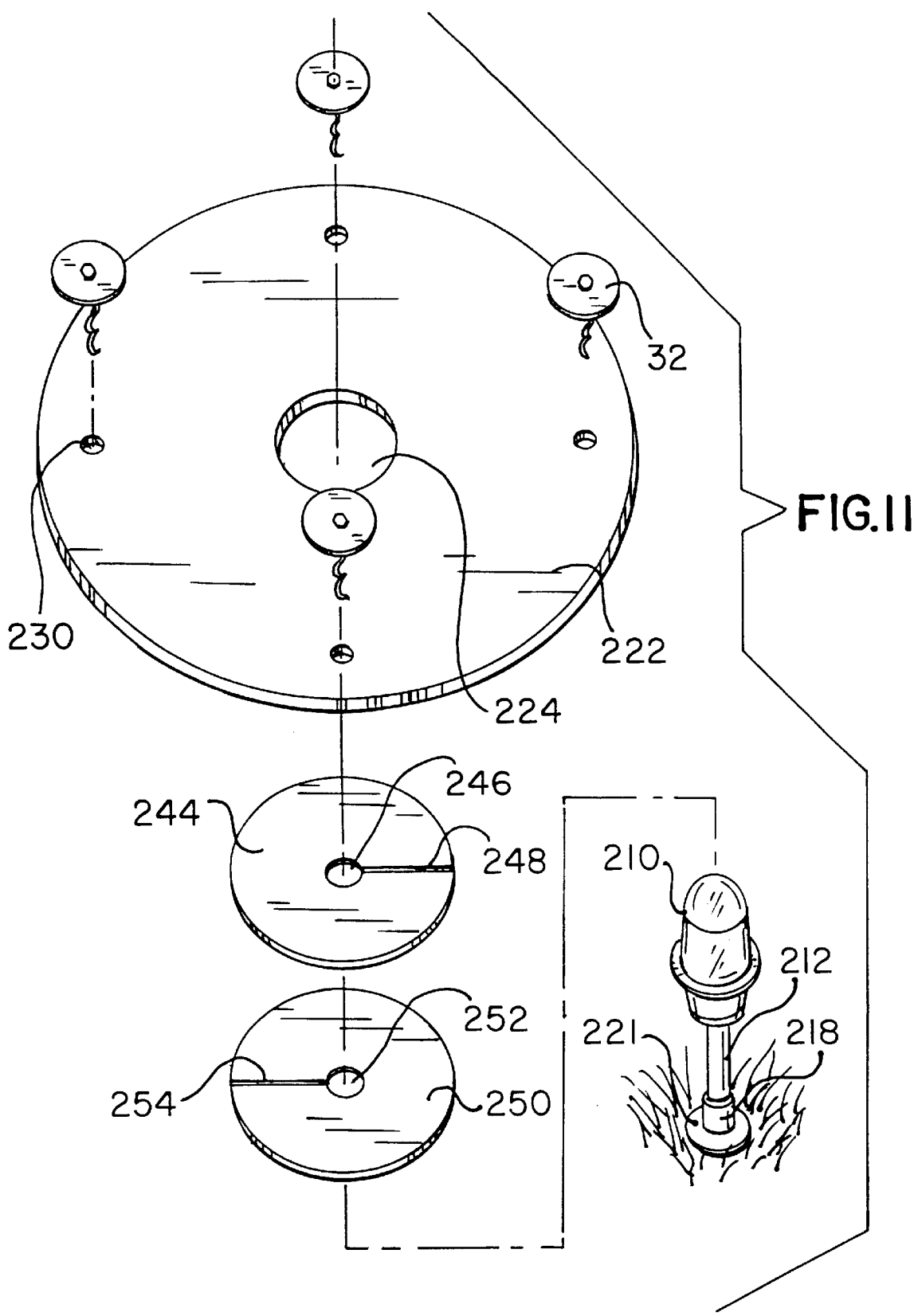
FIG. 11 is an exploded view of the system of FIG. 10.
Figure 12:
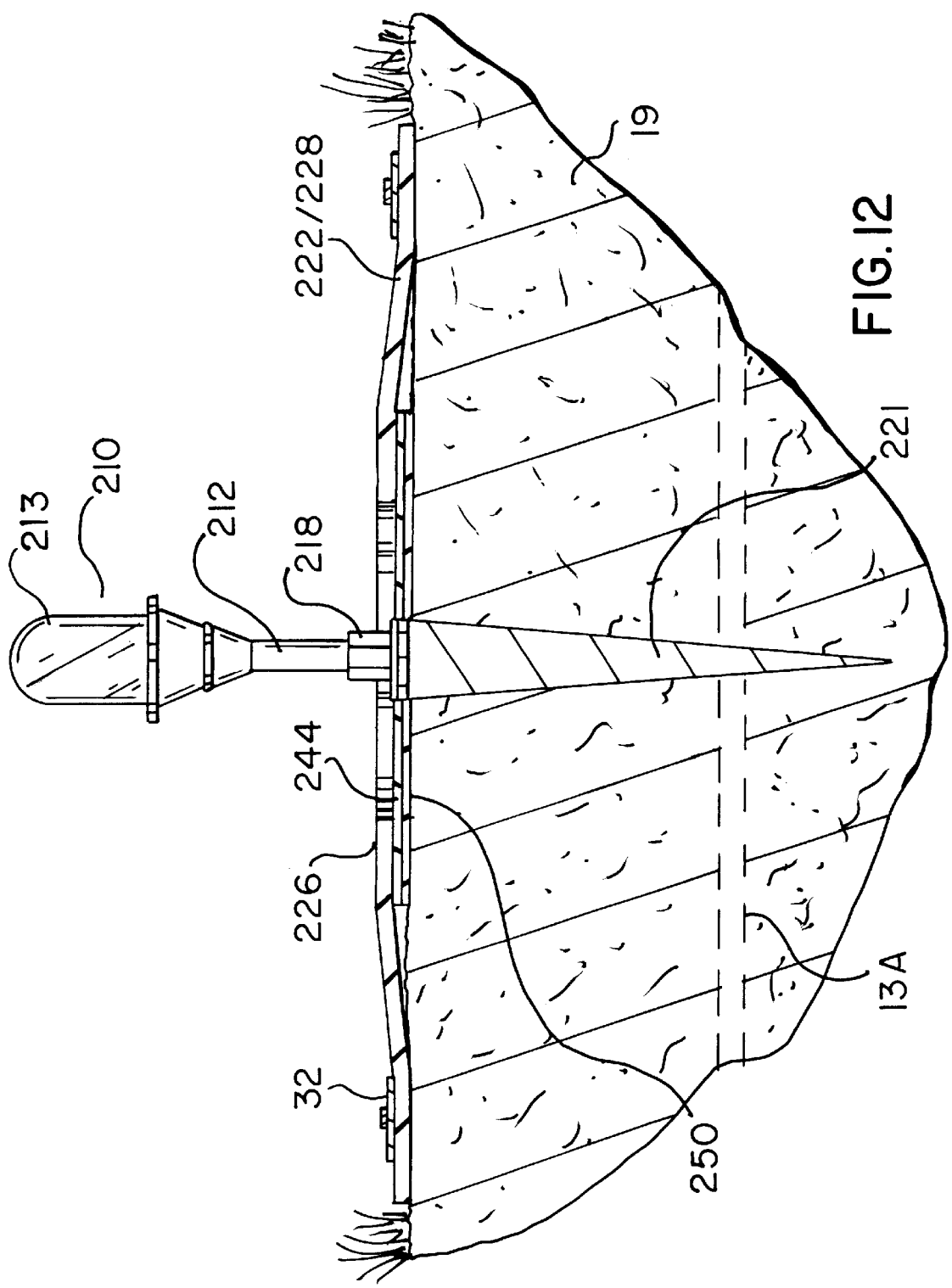
FIG. 12 is a vertical, radial, cross-sectional assembly view of the system of FIGS. 10 and 11.

In FIG. 10 there is shown a further embodiment of the invention which is applicable to a so-called runway stake-type light fixture 210 which may be more particularly appreciated with reference to the vertical diametric cross-sectional view of FIG. 12. It may, therefrom, be noted that said stake-like fixture 210 is secured within earth 19 by long sharp pointed structure 221 such that no concrete base, in the nature of said base 14 (see FIG. 3), is required. In this embodiment, electricity is provided to the light fixture from in-ground cabling 13A. Resultantly, due to the absence of either said concrete block 14 or metallic base 17, breakaway coupling 218 projects directly out of the earth and, therefrom, conduit 212 meets lamp 213. In this embodiment, an axial opening 224 of mat 222 (see FIG. 11) will be smaller than that associated with mat 22 or 122. However, due to the absence of a metallic or concrete structure, the inventive system must be provided with at least one collar 244 (see FIG. 11) and, preferably, also a second collar 250. Said collars, which have a radius twice that of said mat opening 224, include small axial circles 246 and 252 respectively and radial slits 248 and 254 respectively such that said collars, as a first step in the installation of a system of the embodiment. of FIGS. 10 thru 12, may be slipped about conduit 212 such that the axial openings 246 and 252, respectively, engage breakaway coupling 218 (see FIG. 12) beneath conduit 212. After the collars 244 and 250 have been placed about the stake fixture 210, opening 224 of mat 222 will be placed over fixture 210 and upon the uppermost collar 244. As may be noted, axial opening 224 of mat 222 must have a smaller radius than that of the outer radii of collars 244 and 250 respectively to assure that vegetation and other undesirable phenomena (as above described) cannot encroach upon the runway stake fixtures 210. Accordingly, in any situation in which the runway light fixture is not provided with appropriate support or protection in the nature of said metallic support 17 or concrete base 14, the embodiment of FIGS. 10 to 12 may be utilized such that said collars 244 and/or 250 may be employed in combination with said mat 222 to achieve the objects of the invention.

Figure 13:
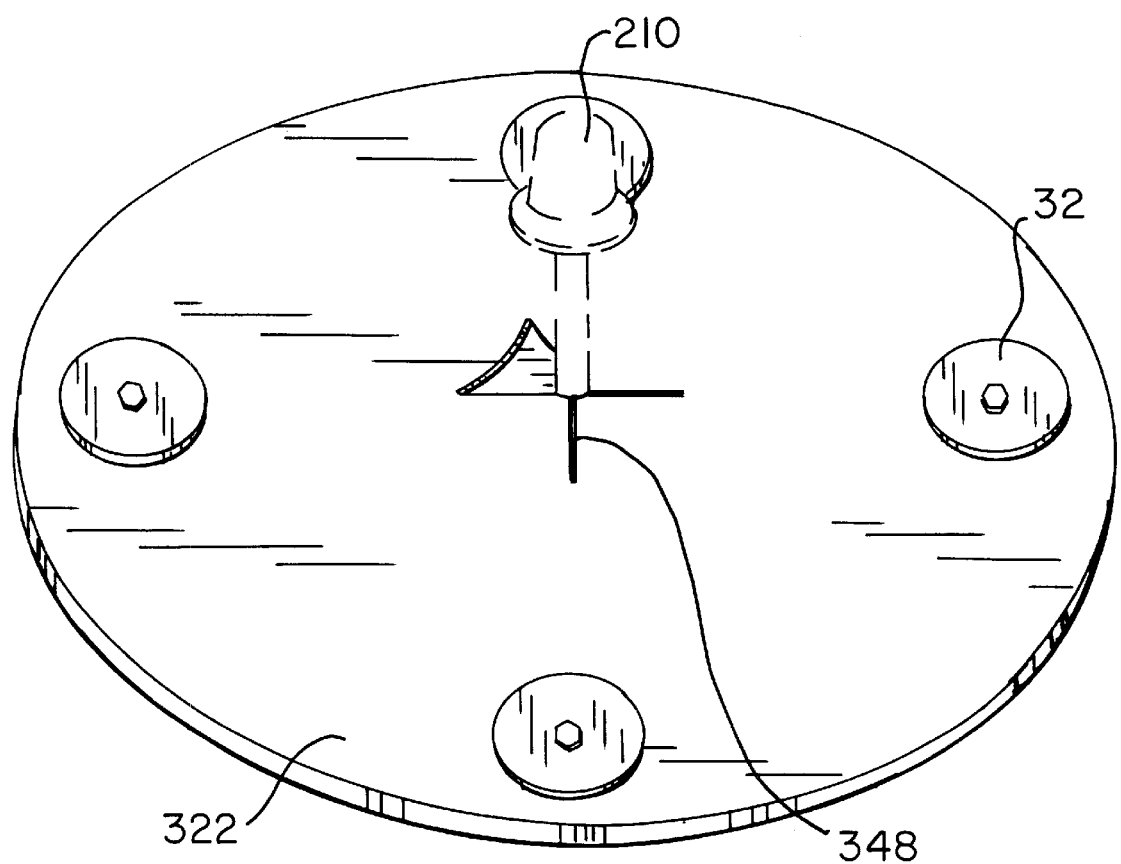
FIG. 13 is a perspective view of a yet further embodiment of the invention.

In FIG. 13 is shown a variation of the embodiment of FIGS. 11–12 in which slits 348 of mat 322 function in lieu of opening 224 of mat 222. Therein collars must still be utilized.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A system for the protection of an airport runway light fixture including a substantially ground level metallic support secured within a ground level substantially circular concrete base, the system comprising:
    (a) a flat flexible mat including an axial opening about a central axis thereof, having a radius from said light fixture, substantially equal to a radius of said metallic support, said mat also having a plurality of peripherally located apertures; and
    (b) a plurality of anchors for said mat, corresponding in number to the number of said apertures, each of said anchors comprising a planar head and, integral therewith, means for penetration and engagement of the ground upon which said mat is to be positioned, said penetration means proportioned for complemental insertion through said peripheral apertures of said mat, wherein said heads of said anchors engage said mat when said penetration means have fully penetrated into the earth upon which said mat is to be secured.

2. The system as recited in claim 1, in which at least one radius of a periphery of said mat defines a dimension of about 2.0 to about 2.5 times a ground level radius or average radial dimension of said concrete base.

3. The system as recited in claim 1, in which at least one outer radius of said mat defines a dimension of about 4 to about 5 times a radius of said metallic support.

4. The system as recited in claim 2, in which at least one radius of said mat defines a dimension of about 4 to about 5 times the radius of said metallic support.

5. The system as recited in claim 2, in which an upper surface of said planar head of said anchor comprises an axially disposed element proportioned for complemental engagement with a drive head of power tool to thereby effect rotation of said anchor into the earth.

6. The system as recited in claim 5, in which said penetration means of said anchor comprises an elongate spiral having a pointed tip thereof.

7. The system as recited in claim 1, in which said penetration means comprises a V-shaped element having a pointed distal end.

8. The system as recited in claim 5, in which said anchor defines a length of about one foot.

9. The system as recited in claim 2, in which said planar head of said anchor defines a circle having a radius in a range between about two to about four inches.

10. The system as recited in claim 9, in which said mat defines a circle.

11. The system as recited in claim 9, in which said mat defines an ellipse.

12. The system as recited in claim 1, in which said mat includes therein a threaded recess for the accommodation of a snow pole.

13. The system as recited in claim 2, in which said mat comprises an inner convex annular region at which said mat covers an annulus defined by a substantially circular concrete base and an integral substantially flat outer region thereabout.

14. The system as recited in claim 2, in which said mat defines a thickness of between about 0.5 and about 1.5 inches.

15. The system as recited in claim 2, in which said mat is formed of a rubber or elastomeric material.

16. The system as recited in claim 13 in which said convex annular portion of said mat comprises a range of about 0.5 to about 3 inches above the elevation of said integral flat portion thereof.

17. The system as recited in claim 2, in which said concrete base is circular at ground level.

18. The system as recited in claim 2, in which said concrete base is square at ground level.

19. A system for the protection of a runway stake-type light fixture having a ground level base having a radius smaller than a radius of said fixture, the system comprising:
    (a) a flat flexible mat including an axial opening having a radius at least equal to a greatest radius of said stake-type light fixture, a total radius of about 20 to about 30 inches, and a plurality of peripherally located apertures;
    (b) at least one flat flexible washer-like annular collar having an axial opening about equal to a diameter of a ground level coupling of said stake-type light fixture, said at least one washer-like collar also having a radial slit between an said axial opening and an outer radius of said collar; and
    (c) a plurality of anchors for said mat, corresponding in number to the number of said apertures, each of said anchors comprising a planar head and, integral therewith, means for penetration and engagement of the ground upon which said mat is to be positioned, said penetration means proportioned for complemental insertion through said peripheral apertures of said mat, wherein said heads of said anchors engage said mat when said penetration means have fully penetrated into the earth upon which said mat is to be secured.

20. The system as recited in claim 19, in which at least one radius of an outer periphery of said mat defines a dimension equal to at least five times said radius of said axial opening thereof.

21. The system as recited in claim 19, in which an upper surface of said planar head of said anchor comprises an axially disposed element proportioned for complemental engagement with a drive head of power tool to thereby effect rotation of said anchor into the earth.

22. The system as recited in claim 21, in which said penetration means of said anchor comprises an elongate spiral having a pointed tip thereof.

23. The system as recited in claim 19, in which said penetration means comprises a V-shaped element having a pointed distal end.

24. The system as recited in claim 19, in which said planar head of said anchor defines a circle having a radius in a range between about two to about four inches.

25. The system as recited in claim 24, in which said mat defines a circle.

26. The system as recited in claim 24, in which said mat defines an ellipse.

27. The system as recited in claim 19, in which said mat comprises an inner convex annular region at which said mat covers an annulus defined by said at least one annular collar and an integral substantially flat outer region thereabout.

28. The system as recited in claim 22, in which said mat defines a thickness of between about 0.5 and about 1.5 inches.

29. The system as recited in claim 19, in which said mat is formed of a rubber or elastomeric material.

30. A system for the protection of a runway stake-type light fixture having a ground level base having a radius smaller than a radius of said fixture, the system comprising:

(a) a flat flexible mat including axial intersecting slits at a center thereof, a total radius of about 20 to about 30 inches, and a plurality of peripherally located apertures;

(b) at least one flat flexible washer-like annular collar having an axial opening about equal to a diameter of a ground level coupling of said stake-type light fixture, said at least one washer-like collar also having a radial slit between an said axial opening and an outer radius of said collar; and (c) a plurality of anchors for said mat, corresponding in number to the number of said apertures, each of said anchors comprising a planar head and, integral therewith, means for penetration and engagement of the ground upon which said mat is to be positioned, said penetration means proportioned for complemental insertion through said peripheral apertures of said mat, wherein said heads of said anchors engage said mat when said penetration means have fully penetrated into the earth upon which said mat is to be secured.

* * * * *

UNITED STATES PATENT AND TRADEMARK OFFICE
Certificate

Patent No. 6,527,407 B2                                                                                                        Patented: March 4, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Lyle E. Gluck, Fort Lauderdale, FL (US); and Marcus Sphatt, Plantation, FL (US).

Signed and Sealed this Thirtieth Day of May 2006.

<div align="right">

SANDRA L. O'SHEA
*Supervisory Patent Examiner*
Art Unit 2875

</div>